United States Patent
Mani (10) Patent No.: US 8,600,239 B2
(45) Date of Patent: Dec. 3, 2013

(54) PRECISE CLOCK SYNCHRONIZATION OVER OPTICAL FIBER

(75) Inventor: Sanjay Mani, Los Altos Hills, CA (US)

(73) Assignee: Symmetricom, San Jose, CA (US)

( * ) Notice: Subject to any disclaimer, the term of this patent is extended or adjusted under 35 U.S.C. 154(b) by 0 days.

(21) Appl. No.: 13/309,500

(22) Filed: Dec. 1, 2011

(65) Prior Publication Data

US 2013/0077964 A1   Mar. 28, 2013

Related U.S. Application Data

(60) Provisional application No. 61/539,450, filed on Sep. 26, 2011.

(51) Int. Cl.
*H04B 10/00* (2013.01)

(52) U.S. Cl.
USPC ............. 398/154; 398/155; 398/34; 398/79

(58) Field of Classification Search
USPC ................. 398/142, 154, 155; 370/252, 503
See application file for complete search history.

(56) References Cited

U.S. PATENT DOCUMENTS

| 4,551,019 | A  | * | 11/1985 | Vella et al. ................... 356/73.1 |
| 6,577,648 | B1 | * | 6/2003  | Raisanen et al. ............. 370/503 |
| 2003/0115321 | A1 | * | 6/2003  | Edmison et al. ............. 709/224 |
| 2008/0151771 | A1 | * | 6/2008  | Dowse ........................ 370/252 |
| 2009/0147806 | A1 | * | 6/2009  | Brueckheimer ............. 370/503 |
| 2011/0299853 | A1 |   | 12/2011 | Zampetti et al. |
| 2012/0213529 | A1 | * | 8/2012  | Hedekvist et al. ........... 398/142 |

OTHER PUBLICATIONS

U.S. Appl. No. 13/091,097, filed Apr. 20, 2011, Zampetti.

* cited by examiner

*Primary Examiner* — Li Liu
(74) *Attorney, Agent, or Firm* — Patterson & Sheridan LLP (57) ABSTRACT

A clock at a first network element that is connected to a second network element over first and second optical links that are physically distinct from each other is aligned using optical timing signals having different wavelengths. Transit delays between the first and second network elements may be determined using the same optical timing signals.

16 Claims, 7 Drawing Sheets

PRECISE CLOCK SYNCHRONIZATION OVER OPTICAL FIBER

CROSS-REFERENCE TO RELATED APPLICATIONS

This application claims the benefit of U.S. provisional patent application Ser. No. 61/539,450, filed Sep. 26, 2011, which is herein incorporated by reference.

BACKGROUND OF THE INVENTION

1. Field of the Invention

Embodiments of the present invention relate generally to time and frequency alignment systems operating over communications networks and, more specifically, to methods and apparatus for precision time transfer over optical fiber.

2. Description of the Related Art

It has been recognized that synchronizing network elements in optical communications networks to a high level of precision enables the provision of advanced services. Consequently, time and frequency alignment are essential to certain types of systems operating with conventional optical networks. For example, accurate time alignment is required by cellular networks, services carried out in real time over a network, and network elements that use packet-based signal formats for multiplexing, transmission, and switching. Similarly, frequency alignment is required in time-division multiplexing (TDM) and media streaming systems that require fixed video or audio sample rates across multiple clients.

One approach known in the art that provides both time and frequency alignment involves computing an aligned time signal based on a master timing signal from a primary reference clock, such as a global positioning system (GPS) satellite timing signal, which is held in precise alignment with a global clock reference. Using GPS signals or other master timing signals at each network element to achieve time or frequency alignment is generally prohibitively expensive and requires each network element to be able to receive satellite time signals from GPS satellites. There are many situations where visibility of GPS satellites may be compromised, interfered with, or interrupted. GPS also has known timing accuracy limitations in various operating modes, such as the L1 only mode that is most common for commercial GPS timing receivers. Consequently, an alternative approach to time alignment is to transmit timing alignment information via a protocol that is operable within a given communications network.

In conventional TDM networks a physical layer method implements frequency alignment throughout the network, starting with a designated master clock system. The designated master clock system delivers frequency and/or timing information via bit-timing and/or symbol-timing information associated with downstream physical communication links. In normal operation, each network element coupled to the master clock system regenerates and distributes the master clock timing information to neighboring downstream network elements in a point-to-point fashion over the physical medium interconnecting adjacent network elements. Thus, each network element within the TDM network receives frequency and/or timing information and aligns local frequency and/or timing with an upstream clock reference, thereby enabling every network element within the TDM network to achieve frequency alignment. Provided that adequate care is taken to avoid timing loops, such a configuration has been proven to be robust. However, the timing reference transferred between elements in the TDM environment is principally a frequency reference as opposed to a time reference.

Packet-based network synchronization methods such as Precision Time Protocol (PTP) and Network Time Protocol (NTP) transfer time and frequency references using packets containing time stamps that identify the times of departure/arrival of packets. These protocols can be used to distribute timing and frequency alignment throughout a network in a point-to-point fashion similar to the way that TDM networks distribute frequency alignment, as described above. For convenience the discussion here considers PTP though essentially identical statements apply in the case of NTP and all other packet-based time transfer methods.

A PTP "grandmaster" can transfer time to a network element coupled to it, a "slave" instantiated on that network element can reconstitute the time, and then a "master" connected to the slave in the same network element can transfer time to a subsequent network element in this point-by-point fashion. PTP and NTP can also operate in a mode where the "slave" clock in a network element can communicate directly with the "master" clock system for timing purposes. In all cases, the accuracy of two-way time-transfer protocols is adversely affected by asymmetry introduced by the communications network connecting the two network elements, including asymmetry in the physical medium, asymmetry in the construction of the forward and reverse paths in the network elements, and other sources. PTP and NTP assume that transit delays between master and slave clocks are symmetric, i.e., the transfer packet delay from a master clock to a slave clock is equal to the transfer packet delay from the slave clock to the master clock. But because forward and reverse physical paths are often different in coupled network elements, they are typically not symmetric.

Networks over which two way time transfer ranging protocols such as PTP and NTP are employed often use separate fiber strands for carrying signals in each direction, i.e., slave-to-master and master-to-slave, and assembly and deployment methods of communication networks often include short lengths of cable for mounting convenience that vary the forward and reverse path lengths between network elements by an unknown amount. The asymmetry in transit delay resulting from such variation in path length can be tens of nanoseconds or much more, while the desired level of time accuracy and time stability in a fiber-optic communication network can be on the order of nanoseconds. Introduction of dispersion compensation elements can increase this error to well beyond 10 s of microseconds. Thus, the ability of PTP and NTP to accurately transfer time between network elements in a fiber-optic network is limited. Causes of asymmetry include, but are not limited to, different propagation velocities of different wavelengths on an optical fiber, different fiber strand lengths in different optical fiber strands used for forward and reverse communications, different physical forward and reverse delays on network elements before the packet time-stamping point, etc. Specifically, the asymmetry in transit delay of timing packets between slave and master clocks provides a bound to the accuracy of time transfer.

SUMMARY OF THE INVENTION

Embodiments of the present invention provide methods for synchronizing a clock at a first network element that is connected to a second network element over an optical fiber link, in which signal transmission from the first network element to the second network element is carried in a different optical fiber strand than the signal transmission from the second network element to the first network element. Timing signals comprising time-stamped packet flows (also referred to as bursts) are exchanged between the two network elements according to a packet-based method protocol such as PTP and the clock at the second network element designated the slave is aligned using the timing information contained in the packet stream to the clock in the first network element, considered the master. Two PTP flows occur concurrently with the optical wavelength for the first flow being distinct from the optical wavelength of the second flow. In this embodiment, each of these timing signals (packet flows) employs two different wavelength channels of the optical fiber link, i.e., two wavelength channels in the forward and two wavelength channels in the reverse direction.

In another embodiment, a first network element is coupled to a second network element over an optical fiber link, where the two forward timing signals from the first network element to the second network element and the two reverse timing signals from the second network element to the first network element are transmitted over different optical fiber strands.

According to other embodiments of the present invention, transit delays through an optical fiber link that connects a slave and a master are determined based on timing information transmitted between the slave and the master and an asymmetry in the transmission speeds through the optical fiber link wherein the timing information is transmitted from the master/server to the slave/client in a first wavelength channel and from the client/slave to the server/master in a second wavelength channel, the asymmetry is determined based on differences in transmission speeds of light in the first and second wavelength channels.

According to still other embodiments of the present invention, transit delays through an optical fiber link that connects a slave and a master are determined based on timing information transmitted between the slave and the master and an asymmetry in the transmission speeds through the optical fiber link wherein the timing information is transmitted from the master/server to the slave/client in a first wavelength channel and from the client/slave to the server/master in the same wavelength channel. This estimation of transit delay is made at different times and the variation in the asymmetry based on differences in transmission speeds of light in the medium due to environmental differences at the different measurement times is used to determine changes in environmental conditions. This embodiment requires good oscillators or other known good means for syntonizing the master and slave clocks such as Synchronous Ethernet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
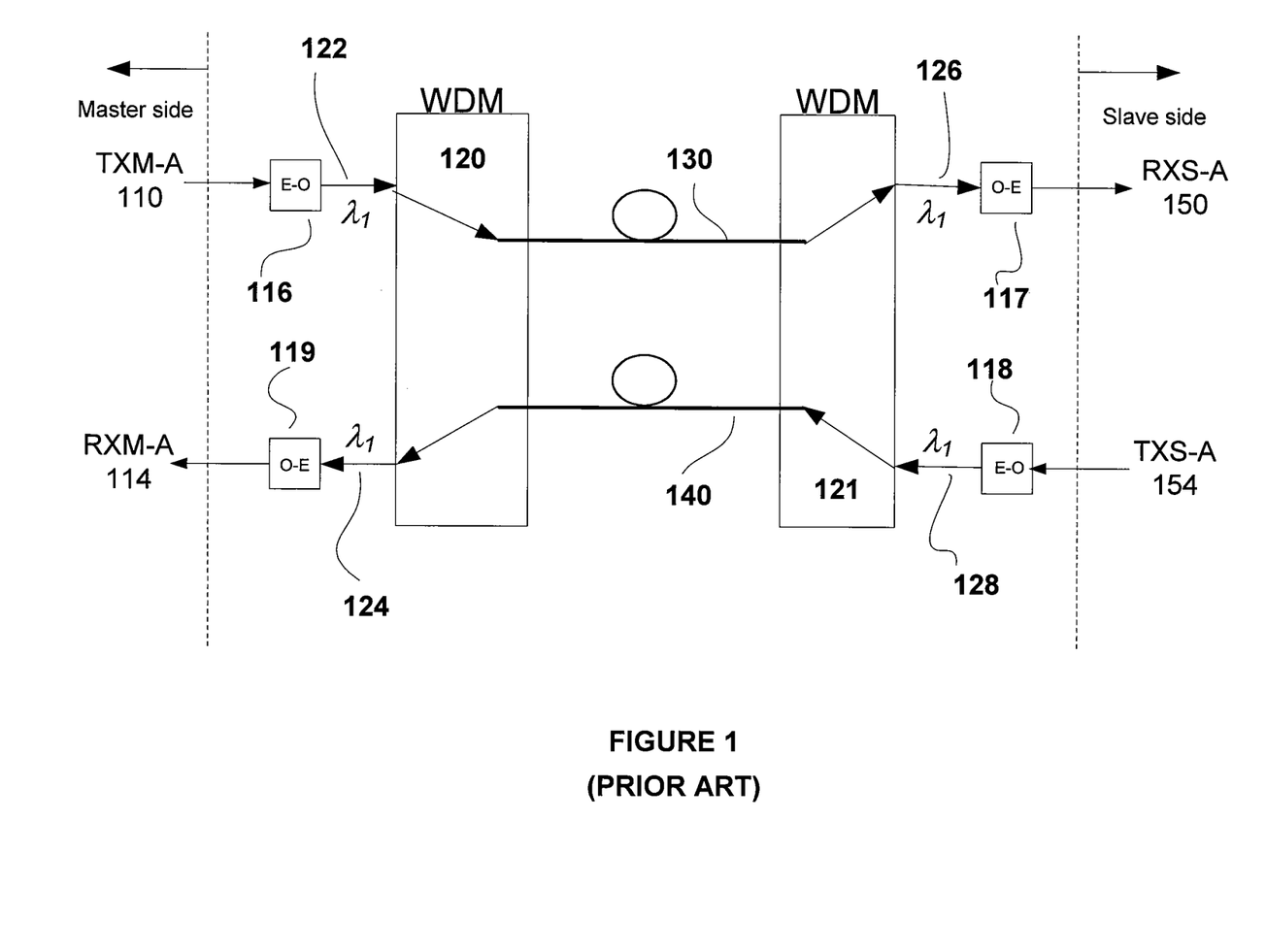
FIG. 1 depicts a conventional connection between a master and slave over an optical link using one strand in each direction.

FIG. 1 depicts a conventional connection between master and slave clocks over a fiber optic channel. Not explicitly shown in FIG. 1 are the master and slave clock devices themselves. In the downstream direction (master to slave direction) the transmit signal from the master device, designated as TXM-A 110, is electrical in nature. This is converted into an optical signal 122 with wavelength $\lambda_1$ by the electrical-to-optical (E-O) converter 116. In most modern fiber-optic transmission gear a wavelength division multiplexing WDM function 120 is applied so that multiple optical wavelength channels can share the same fiber optic strand 130. The WDM function at the slave side 121 extracts the wavelength $\lambda_1$ signal 126 that is converted into an electrical signal by the optical-to-electric (O-E) converter 117 and delivered as the receive signal RXS-A 150 to the slave clock.

In the upstream direction (slave to master direction) the transmit signal from the slave device, designated as TXS-A 154, is electrical in nature. This is converted into an optical signal 128 with wavelength $\lambda_1$. The wavelength division multiplexing WDM function 121 is applied so that multiple optical wavelength channels can share the same fiber optic strand 140. The WDM function at the master side 120 extracts the wavelength $\lambda_1$ signal 124 that is converted into an electrical signal and delivered as the receive signal RXM-A 114 to the master clock.

For simplicity, in FIG. 1 optical signals of other wavelengths are not shown.

Figure 2:
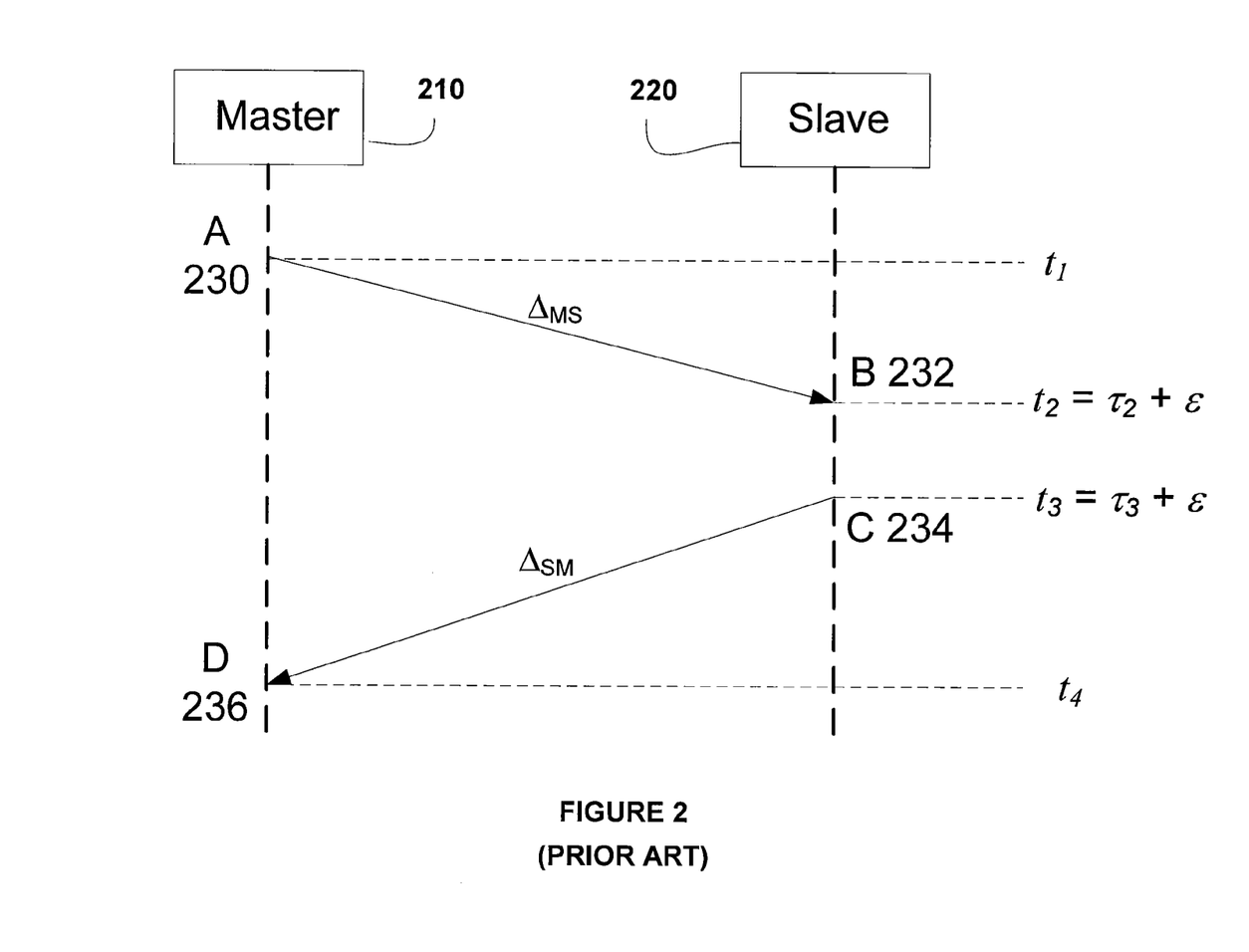
FIG. 2 provides an event diagram illustrating the time-stamps associated with the times of departure and times of arrival of packets constituting the two-way timing signal as the packets are transferred between the master and slave.

Traditional packet-based two-way time transfer methods follow the event diagram shown in FIG. 2. The terminology used here is that from PTP but the same principles apply to all methods and protocols. Referring to FIG. 2, the sequence of events and important items of information associated with an exchange of packets between master 210 and slave 220 are:

Event A 230: Packet is transmitted by Master and time-of-departure is $t_1$.

Event B 232: Packet arrives at Slave that measures the time-of-arrival as $\tau_2$; assuming that the slave time offset from master is $\epsilon$, the actual time-of-arrival with respect to the master timescale is $t_2 = \tau_2 + \epsilon$.

Event C 234: Packet is transmitted by Slave that notes the time-of-departure is $\tau_3$; assuming that the slave time offset from master is ϵ, the actual time-of-departure with respect to the master timescale is $t_3 = \tau_3 + \epsilon$.

Event D 236: Packet arrives at Master that measures time-of-arrival as $t_4$.

Such a two-way exchange of packets can provides information suitable for allowing the slave to align in time with the master (assuming that both sides have knowledge of the time-stamps). There are four measured values that can be communicated between the Master and Slave, namely, $(t_1, \tau_2, \tau_3, t_4)$. Denoting by $\Delta_{MS}$ and $\Delta_{SM}$ the transit delays between the Master and Slave and vice versa, the following equations can be established:

$$t_4 = \tau_3 + \epsilon + \Delta_{SM} \text{(from an } S\text{-to-}M \text{ packet)}$$

$$t_1 = \tau_2 + \epsilon - \Delta_{MS} \text{(from a } M\text{-to-}S \text{ packet)} \quad \text{(Eq. 1)}$$

Note that there are two equations with three unknowns (ϵ, $\Delta_{MS}$, $\Delta_{SM}$) so it is common to assume reciprocity of transit delay between the two devices, thereby reducing the number of unknowns to 2 and therefore computing ϵ, the slave time offset from master. This assumption implies that there is an inherent error in the time transfer that is related to the asymmetry of the transit delay in the two directions. Specifically, the error in time transfer will have an error that is nominally:

$$\varepsilon_A = \frac{\Delta_{MS} - \Delta_{SM}}{2} \quad \text{(Eq. 2)}$$

The asymmetry in transit delay of timing packets between slave and master provides a statistical bound to the accuracy of time transfer that can be guaranteed. Packet-based methods like PTP and NTP use separate fiber strands or fiber wavelengths for carrying the signal in the two directions (S-to-M and M-to-S). Assembly and deployment methods often include pigtails and short lengths of cable for mounting convenience. The asymmetry resulting from the different paths can be tens of nanoseconds or more. Thus the ability of traditional time-transfer methods based on PTP and NTP to accurately transfer time in a fiber-optic network is limited.

There are several methods that can be postulated to address this problem. The invention described in U.S. patent application Ser. No. 12/835,586, filed Jul. 13, 2010 and entitled "Precision Time Transfer over Optical Fiber," the entire contents of which are included herein by reference, intentionally and particularly uses the same strand of cable to carry signals in both directions. Consequently asymmetry related to cable transmission is negligible (sub-picosecond). One of the applications for the invention in U.S. patent application Ser. No. 12/835,586 is to calibrate the transit delay of fibers in a pre-deployment phase and then use this calibration data to provide the requisite correction if PTP, or NTP, or any other method that is not well suited to account for asymmetry, is used.

Another approach to reducing the impact of asymmetry is to ensure that the cable lengths for the two directions are exactly the same. This may be permissible for specialized applications like in a laboratory environment but not feasible to implement in normal telecommunications deployments.

Embodiments of the invention described here recognize that there may be asymmetry between the two fiber optic cables but still generates a correct value for slave time offset from master. This is achieved by establishing two or more PTP sessions between the Master and Slave clocks. According to embodiments of the invention, the transit delay asymmetry of an optical link between two network elements is compensated to precisely synchronize clocks embedded in each network element.

Figure 3:
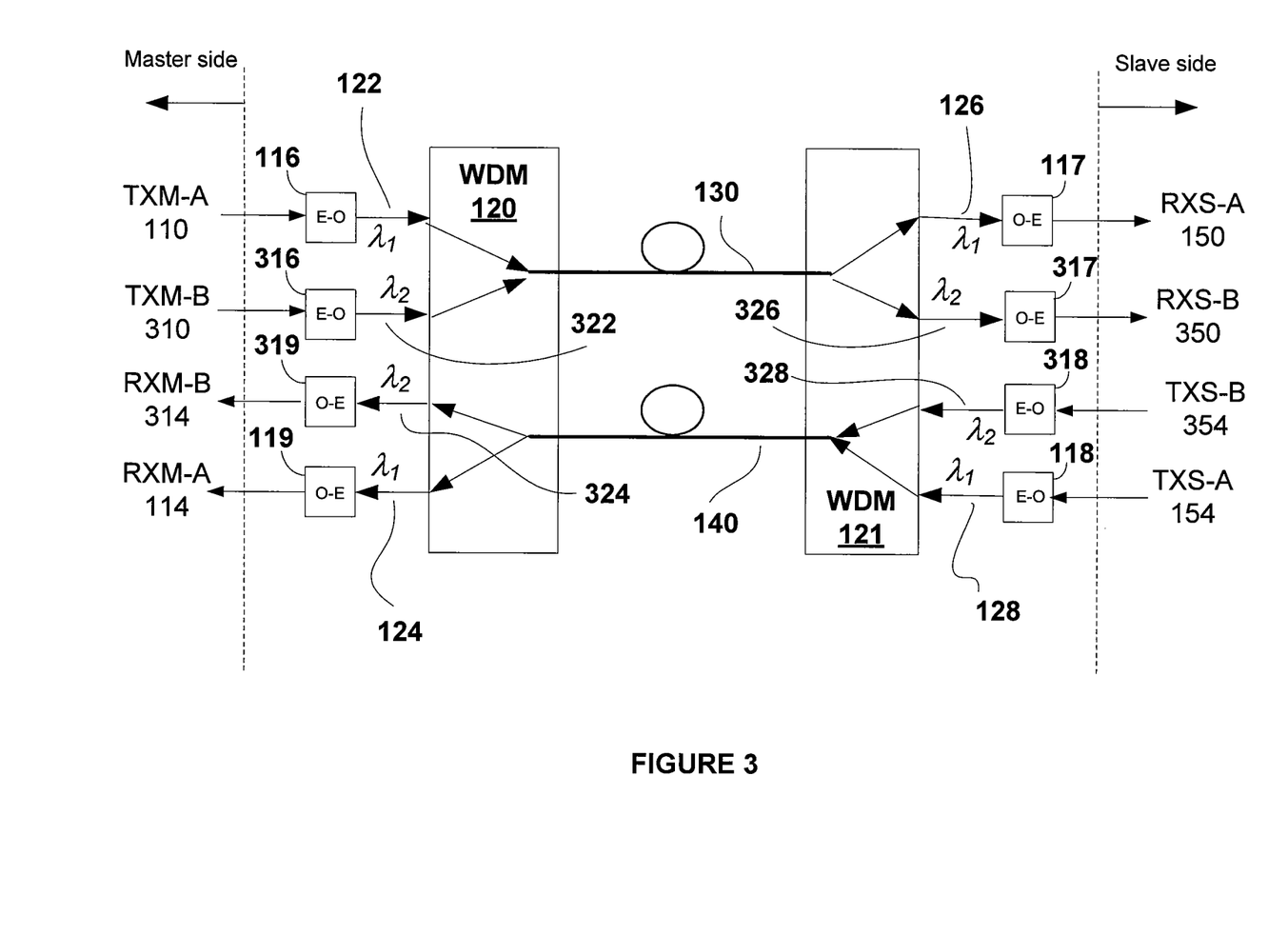
FIG. 3 depicts the features of one embodiment of the invention whereby two PTP flows run concurrently between a master and slave using two different optical wavelength channels.
Figure 4:
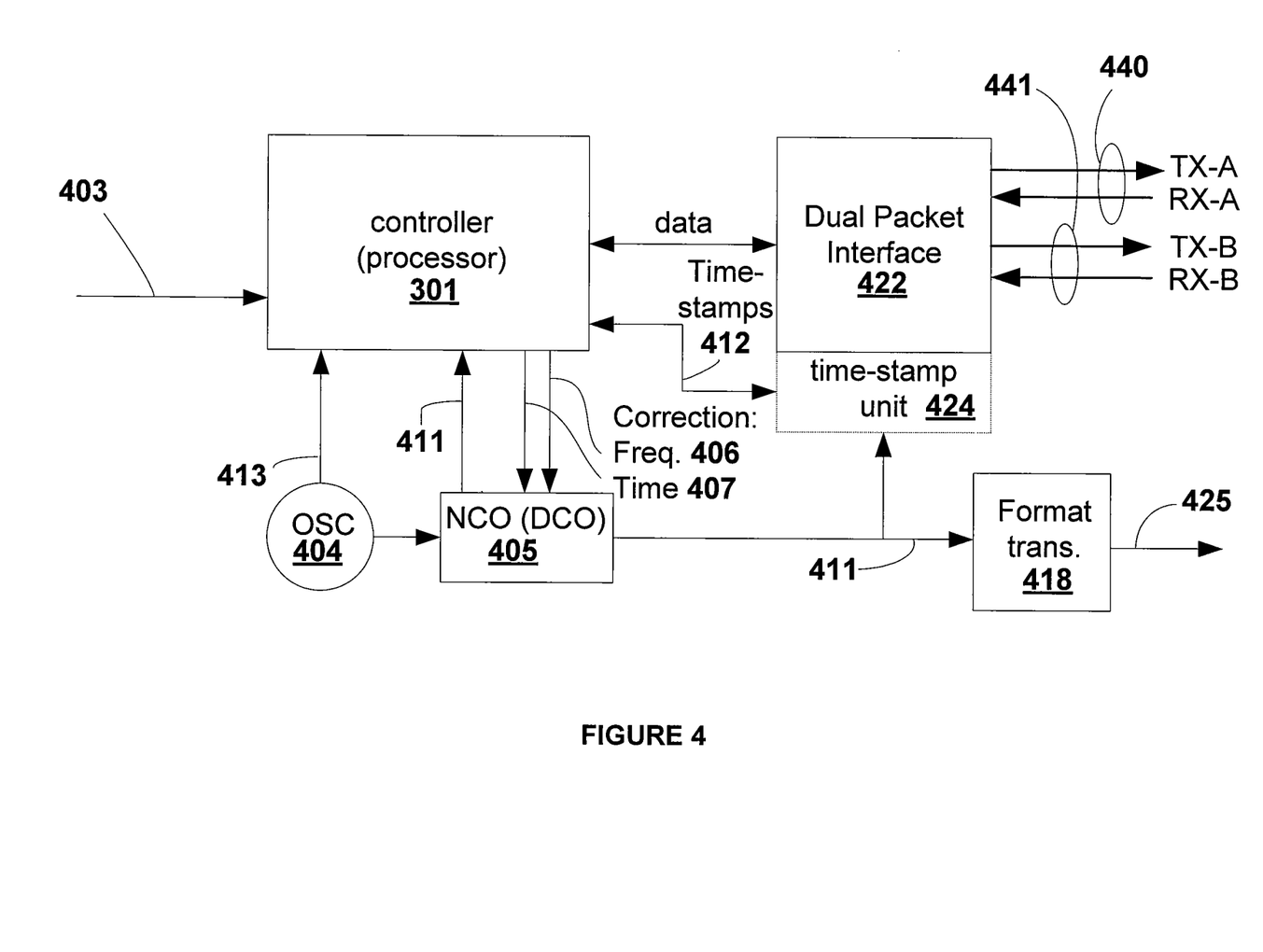
FIG. 4 schematically illustrates the principal components and functions of the electrical components of a master or slave in the various embodiments of the invention.

FIG. 3 schematically illustrates the physical layer connection in one embodiment of the invention. The slave/master clocks are based on the circuit arrangement shown in FIG. 4. As indicated in FIG. 4, the master (and slave) clocks provide two electrical ports 440 and 441 that can support two PTP flows that are designated "A" and "B" for specificity. It should be recognized that the arrangement shown in FIG. 4 can be reconfigured to support more than two PTP flows. It should also be recognized that PTP master and slave clock devices can be based on near-identical hardware, and descriptions of PTP operation including methods to perform time transfer robustly are provided in U.S. patent application Ser. No. 13/091,097, filed Apr. 20, 2011 and entitled "Method for Generating a Robust Timing Correction in Timing Transfer Systems," the entire contents of which are included by reference.

As indicated in FIG. 3, one PTP session designated as "A" is established between the master and the slave over the fiber-optic cable pair using wavelength channel identified with wavelength $\lambda_1$. A second PTP session designated as "B" is established using wavelength $\lambda_2$. Additional PTP sessions can be established using additional wavelengths but for simplicity these are not explicitly indicated in FIG. 3. The electrical timing signals transmitted by the master are TXM-A 110 and TXM-B 310 that are converted into optical wavelengths $\lambda_1$ (122) and $\lambda_2$ (322) by electrical-to-optical converters 116 and 316, respectively. The two wavelengths, along with other wavelengths in the system are wavelength division multiplexed by WDM 120 and carried over optical fiber strand 130 to the slave side where the WDM 121 extracts the two wavelength channels 126 and 326. Optical-to-electrical converters 117 and 317 convert the optical wavelengths $\lambda_4$ (126) and $\lambda_2$ (326) into electrical signals RXS-A 150 and RXS-B 350 that constitute the receive signals of PTP session "A" and "B" at the slave, respectively. The electrical timing signals transmitted by the slave are TXS-A 154 and TXS-B 354 that are converted into optical wavelengths $\lambda_1$ (128) and $\lambda_2$ (328) by electrical-to-optical converters 118 and 318, respectively. The two wavelengths, along with other wavelengths in the system are wavelength division multiplexed by WDM 121 and carried over optical fiber strand 140 to the master side where the WDM 120 extracts the wavelengths 124 and 324. Optical-to-electrical converters 119 and 319 convert the optical wavelengths $\lambda_1$ (124) and $\lambda_2$ (324) into electrical signals RXS-A 150 and RXS-B 350 that constitute the receive signals of PTP session "A" and "B" at the slave, respectively.

Denote by $L_{MS}$ the length of the optical fiber in the master-to-slave direction and by $L_{SM}$ the length of the fiber in the slave-to-master direction. For a given fiber material and technology, the ratio of the velocity of light in the fiber at the two wavelengths is not necessarily one, and not necessarily known a priori and we denote that by μ. Since the velocities at the two wavelengths are different, the transit delay across the fiber in the downstream direction, or upstream direction, is different for the two PTP sessions.

Suppose that two reference sets of time-stamps for the two sessions, "A" and "B", are denoted by $\{t_{1A}, \tau_{2A}, \tau_{3A}, t_{4A}\}$ and $\{t_{1B}, \tau_{2B}, \tau_{3B}, t_{4B}\}$, respectively. It can be shown that:

$$\varepsilon = \frac{\mu \cdot (\tau_{2A} - t_{1A}) - (\tau_{2B} - t_{1B})}{(1 - \mu)} \quad \text{(Eq. 3)}$$

$$\varepsilon = \frac{\mu \cdot (t_{4A} - \tau_{3A}) - (t_{4B} - \tau_{3B})}{(\mu - 1)} \quad \text{(Eq. 4)}$$

If $\mu$ is known, then either Eq. (1) or Eq. (2) can be used to establish the slave clock time offset from master, $\varepsilon$. However, since $\mu$ is generally not known, the pair of equations Eq. (3) and Eq. (4) yields the following expression for $\mu$:

$$\mu = \frac{(t_{4B} - \tau_{3B}) + (t_{2B} - \tau_{1B})}{(\tau_{2A} - t_{1A}) + (t_{4A} - \tau_{3A})} \quad \text{(Eq. 5)}$$

Note that Eq. (5) is based on known values for the 4 timestamps of each of the two PTP sessions and that the slave clock time offset from master can then be established using Eq. (3).

Note that Eq. (3) and Eq. (4) are solely dependent on the ratio of the wavelengths $\mu$. As a result, in the case where the underlying optical wavelength velocities vary over the fiber length but the ratio remains constant, the equation will still be valid.

In some instances the fiber characteristics are known a priori and therefore the ratio of velocities, $\mu$, is known a priori. In this case it is possible to establish the ratio of the optical fiber lengths. Specifically, $$\frac{L_{MS}}{L_{SM}} = \mu \cdot \frac{(\tau_{2A} + \varepsilon) - t_{1A}}{t_{4A} - (\tau_{3A} + \varepsilon)} \quad \text{(Eq. 6)}$$

For notational simplicity, the terms $\varepsilon$ and $\mu$ are not subscripted. Considering that the PTP sessions involved are "A" and "B", these terms could be written as $\varepsilon_{AB}$ and $\mu_{AB}$. Considering a third PTP session, "C", utilizing wavelength channel $\lambda_3$, the slave clock time offset from master could be estimated as $\varepsilon_{AC}$ by considering PTP sessions "A" and "C". As taught in U.S. patent application Ser. No. 13/091,097, filed Apr. 20, 2011 and entitled "Method for Generating a Robust Timing Correction in Timing Transfer Systems," the two estimates for time offset can be advantageously combined by weighting each with a quality measure. In the current situation since the transmission medium is the same for all wavelengths, it is appropriate to weight the estimates equally. The extension to the weighted combination of more than two estimates is shown in U.S. patent application Ser. No. 13/091,097. Other methods to optimally combine multiple estimates are known in the art that can be applied to this asymmetry and time estimation problem.

Figure 5:
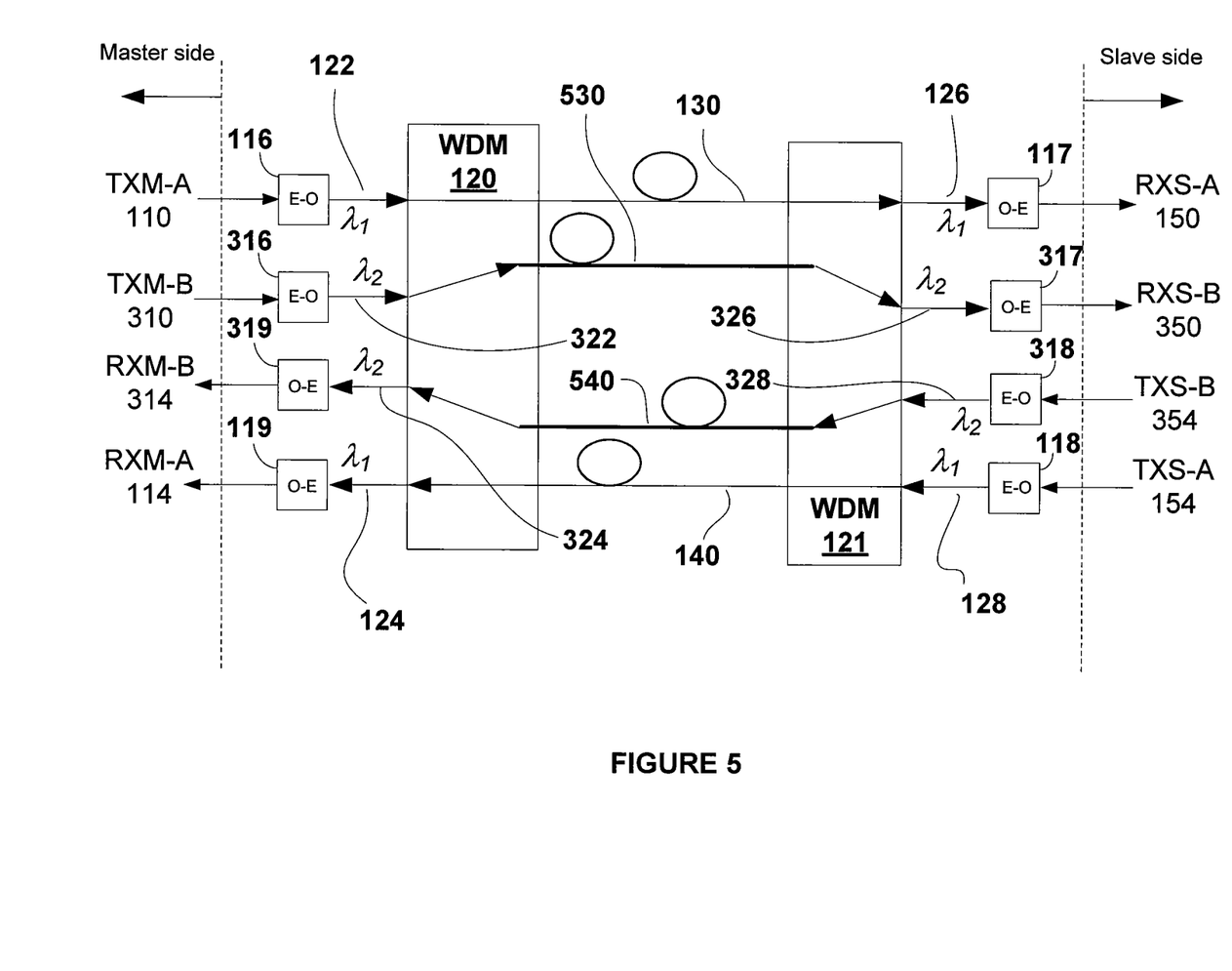
FIG. 5 depicts the features of one embodiment of the invention whereby two PTP flows run concurrently between the master and slave using two different optical fibers.

In another embodiment depicted in FIG. 5, the two downstream signals are delivered over separate fiber strands 130 and 530 and the two upstream signals are delivered over separate fibers 140 and 540. In this case the premise is that the two strands carrying the downstream signal are of substantially the same length and properties as are the two strands carrying the upstream signal of substantially the same length and properties. The method described above applies in this case since from a delay perspective the structures depicted in FIG. 5 and in FIG. 3 are substantially the same.

Figure 6:
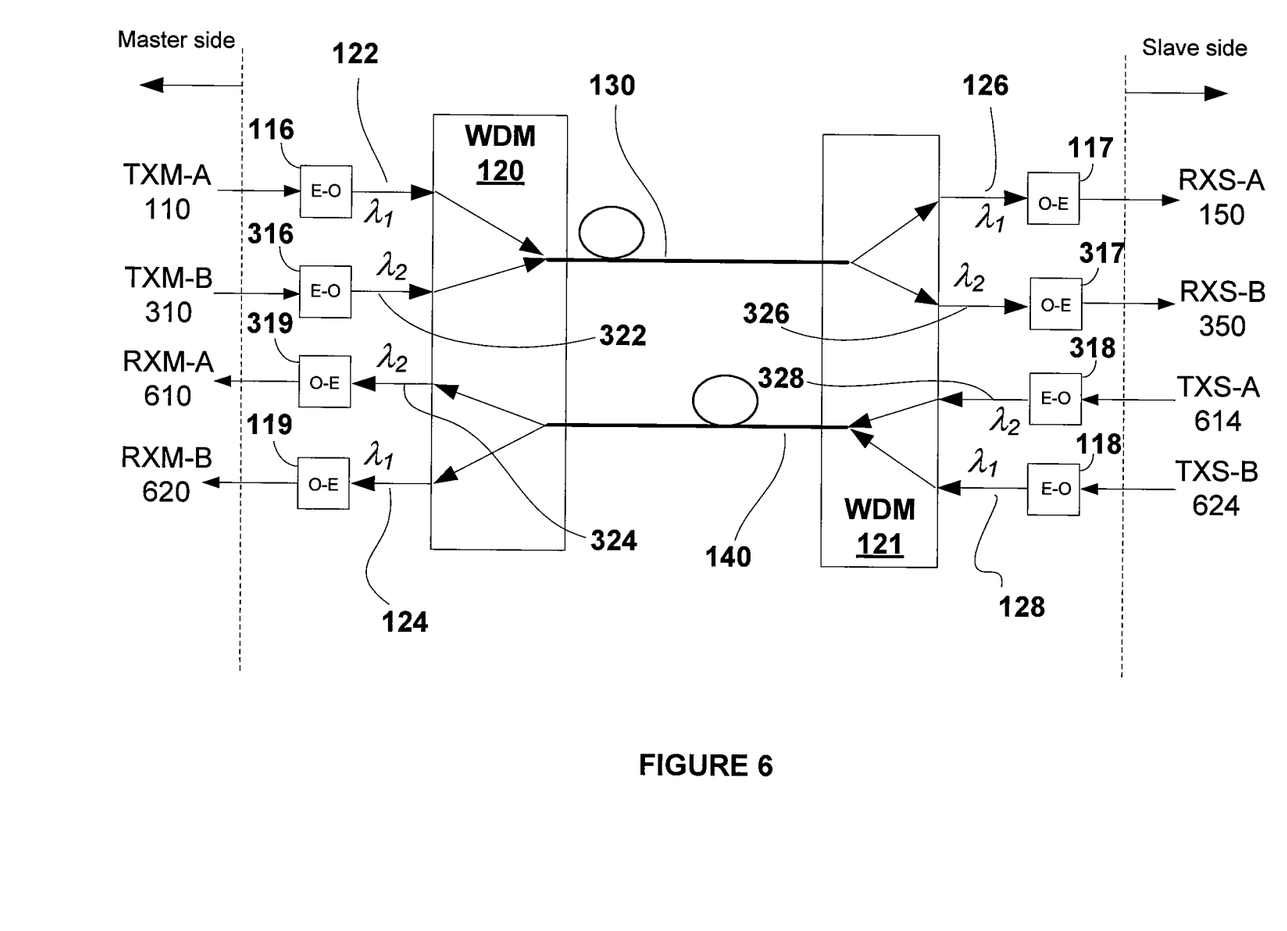
FIG. 6 depicts the features of one embodiment of the invention whereby two PTP flows run concurrently between the master and slave using two different wavelength channels with upstream wavelength of a PTP flow being different from the downstream wavelength.

In another embodiment depicted in FIG. 6, the wavelength used for the downstream signal for PTP session A is $\lambda_1$; and the wavelength used for the downstream signal of PTP session B is $\lambda_2$. For the upstream signals, the wavelength assigned to PTP session A is $\lambda_2$ and that for PTP Session B is $\lambda_1$. This difference in assignment of wavelengths for the upstream and downstream directions serves to correct for minor differences in the electrical-to-optical converters and optical-to-electrical converters for the two wavelengths.

In addition to estimating the asymmetry correction and either ratio of fiber lengths or the ratio of velocities at the two wavelengths, there are other applications for this method.

In one such application, it is possible to estimate the offset asymmetry, ratio of index of refraction, and ratio of path lengths as above. This algorithm can be executed on each packet exchange, and as the change in temperature and path length is likely much slower than the rate of packet exchange, multiple estimates can be combined to create an optimal estimate of the offset asymmetry. With the offset asymmetry, the correct time can then be estimated on the slave clock using PTP, NTP or any other 2-way timing protocol.

In another such application, by providing a stable frequency source to the slave clock, the slave time offset from master scan be made a constant over a reasonable interval of time, say 24 hours. The stable frequency source could be, for example, a good oscillator.

Another embodiment for maintaining syntonization between master/server and slave/client is to deploy Synchronous Ethernet to each of the two devices to separate, stable, sources since Synchronous Ethernet directly between the two devices is likely to be affected by temperature and environmentals to the same extent as the time transfer. Syntonization of master and slave implies that the slave time offset, $\varepsilon$, will be essentially constant. Then, for example from Eq. 5, the variation in the ratio of velocities at the two wavelengths can be tracked. In this case, the two sets of timestamps are being acquired at different times (say night and day). It should be understood that index of refraction in optical fibers is temperature dependent and therefore the velocity ratio is temperature dependent, so embodiments of the invention can be extended to monitoring the effective temperature of the environment of the fiber optic cable.

In another embodiment, only one time transfer 'loop' is run on a single lambda pair, but multiple acquisitions are performed at different times during the day where the temperature of the optical fiber is different. Therefore, at these two different acquisition points, the velocity of the optical signal is different, so the velocity ratio $\mu$ is not unity. In this embodiment, syntonization is maintained between the master and the slave, using PTP and methods such as those described in U.S. patent application Ser. No. 13/091,097. Alternatively syntonization could be maintained using calibrated stable oscillators at both sides, or through physical-layer timing transfer methods such as Synchronous Ethernet, potentially from separate, stable sources. Due to syntonization, the slave time offset from master $\varepsilon$ is a constant, or close to a constant. Now the two reference sets of time-stamps for the two sessions, "A" and "B", have been acquired using a single lambda but at different times, and the same equations 3, 4, 5 can be used to estimate the asymmetry. Note that this embodiment could be realized with the architecture of FIG. 1, but in fact element 120 WDM is not required since only a single wavelength is being used. This method can be used to estimate asymmetry in a metro Ethernet outdoor link as there is one lambda on each Fiber 130, 140.

In the single lambda method using temperature variation to create different velocity time loops, it is possible to estimate the offset asymmetry, ratio of index of refraction, and ratio of path lengths. This algorithm can be executed on each packet exchange, and as the change in temperature and path length is likely much slower than the rate of packet exchange, multiple estimates can be combined to create an optimal estimate of the offset asymmetry. With the offset asymmetry, the correct time can then be estimated on the slave clock using PTP, NTP or any other 2-way timing protocol.

Figure 7:
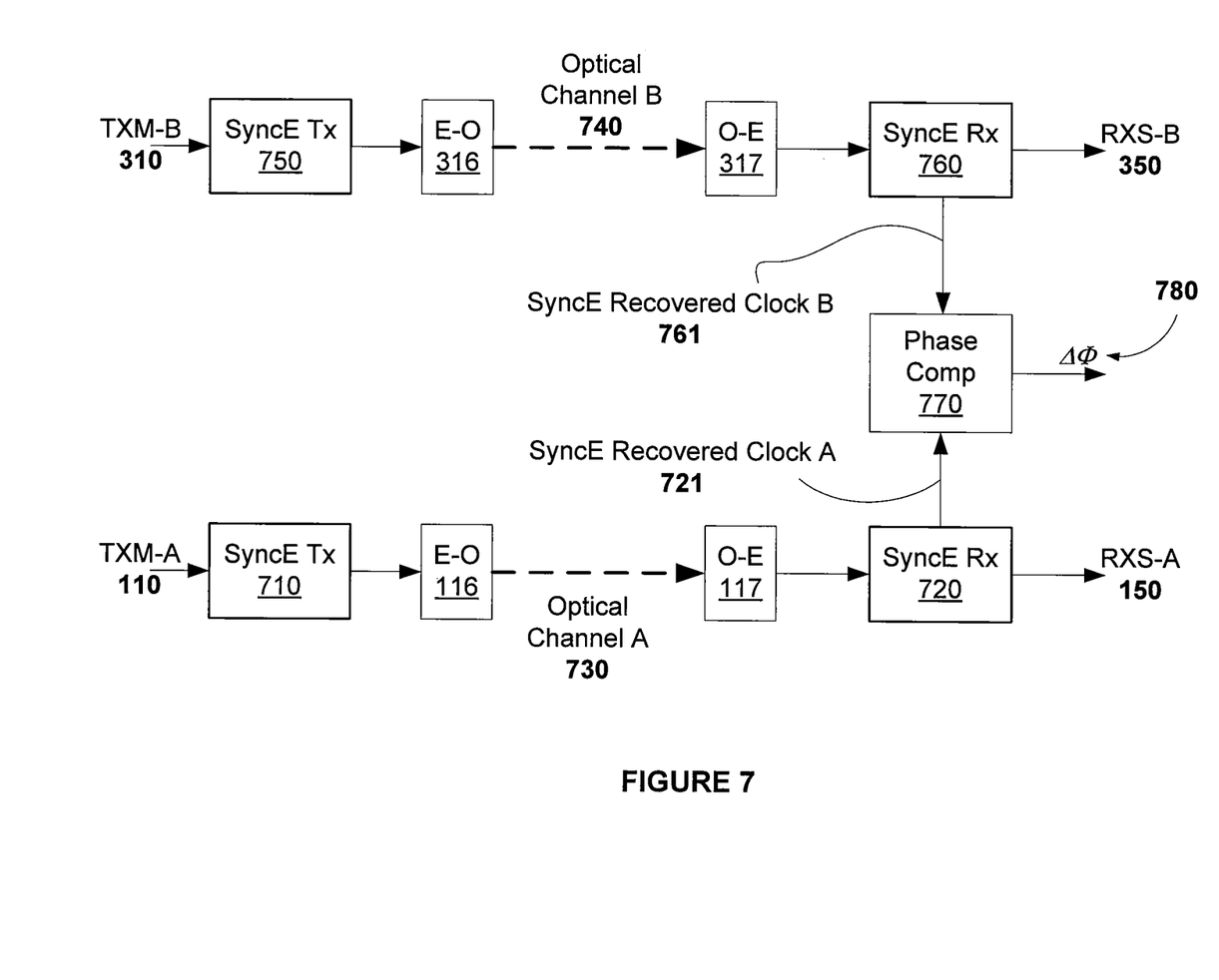
FIG. 7 depicts one embodiment of the invention that compares the phase of a recovered clock between two sessions when phase transfer is achieved using Synchronous Ethernet.

It is advantageous to enhance the phase offset estimation with Synchronous Ethernet. As shown in FIG. 7, the signal TXM-A is transmitted over a link employing Synchronous Ethernet using transmit driver 710. The electrical signal is converted into optical by converter 116. It is also possible to integrate units 710 and 116 into a single device. The optical signal is connected to the receiving device over an optical channel A 730. The receiver extracts recovered clock A 721 from the Ethernet carrier. Similarly, the signal TXM-B is transmitted over a link employing Synchronous Ethernet using transmit driver 750. The optical signal is carried in optical channel B 740. The optical channels 730 and 740 could be two different wavelengths in the same optical fiber as in FIG. 3 or could be in different fibers as in FIG. 5. Synchronous Ethernet receivers provide recovered clock signals 721 and 761 that are compared in phase. The phase difference $\Delta\Phi$ will have some nominal value. Changes in the environment will cause the effective velocity of light at the two wavelengths used for "A" and "B" to change by different amounts. This will be manifested directly as a change in $\Delta\Phi$. Monitoring this phase provides a means to monitor the environment of the fiber transmission medium and this can be used in conjunction with the methods that monitor the time offset as described above. Monitoring the phase difference also offers the opportunity for high resolution assessment of phase difference between the two optical carriers.

Utilizing multiple wavelength channels permits the comparison of phase difference ($\Delta\phi$) between the optical carriers taken in pairs. The multiple observations of phase difference provide multiple estimates of ambient temperature. As taught in U.S. patent application Ser. No. 13/091,097, filed Apr. 20, 2011 and entitled "Method for Generating a Robust Timing Correction in Timing Transfer Systems," the multiple estimates can be advantageously combined by weighting each with a quality measure. In the current situation since the transmission medium is the same for all wavelengths, it is appropriate to weight the estimates equally. Whereas U.S. patent application Ser. No. 13/091,097 addresses timing corrections, the same principles apply to estimates of other parameters such as temperature and other environmental conditions.

In FIG. 7, the transmission scheme depicted is that of Synchronous Ethernet. Instead of Synchronous Ethernet any other method that utilizes synchronous layer-1 transmission can be substituted. Such synchronous layer-1 methods include SONET (Synchronous Optical Network) or SDH (Synchronous Digital Hierarchy). In these cases the information is inserted into the transmitted signal using standardized procedures for encapsulating packets in the SONET/SDH frame.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. A method of synchronizing a clock in an optical network including a first network element that is connected to a second network element, comprising:
transmitting optical timing signals at a first wavelength and at a second wavelength from the first network element to the second network element;
transmitting optical timing signals at the first wavelength and at the second wavelength from the second network element to the first network element;
determining a ratio between velocities of light at the first wavelength and at the second wavelength based on timing information contained in the optical timing signals; and
aligning the clock based on at least the ratio between the velocities of light and the timing information,
wherein the optical timing signals transmitted from the first network element to the second network element are transmitted over one or more optical links which are distinct from one or more optical links over which the optical timing signals from the second network element to the first network element are transmitted.

2. The method of claim 1, wherein optical timing signals are transmitted at the first wavelength and at the second wavelength over a first optical link from the first network element to the second network element, and optical timing signals are transmitted at the first wavelength and at the second wavelength over a second optical link from the second network element to the first network element.

3. The method of claim 1, wherein the optical timing signals comprise time-stamped packet flows.

4. The method of claim 1, further comprising:
receiving a first synchronous signal at a first wavelength over the optical fiber;
recovering a first carrier signal based on the first synchronous signal;
receiving a second synchronous signal at a second wavelength that is different from the first wavelength over the optical fiber;
recovering a second carrier signal based on the second synchronous signal; and
monitoring a relative phase between the first and second carrier signals to detect changes in the environment.

5. The method of claim 4, wherein the first and second synchronous signals are each a Synchronous Ethernet signal.

6. The method of claim 1, wherein optical timing signals are transmitted at the first wavelength and at the second wavelength over respective first and second optical links from the first network element to the second network element, and optical timing signals are transmitted at the first wavelength and at the second wavelength over respective third and fourth optical links from the second network element to the first network element.

7. A method of synchronizing a clock in an optical network including a first network element that is connected to a second network element over first and second optical links that are physically distinct from each other, comprising:

transmitting optical timing signals at a given wavelength over the first optical link from the first network element to the second network element at a first time;

transmitting optical timing signals at the given wavelength over the second optical link from the second network element to the first network element at the first time;

transmitting optical timing signals at the given wavelength over the first optical link from first network element to second network element at a second time;

transmitting optical timing signals at the given wavelength over the second optical link from the second network element to the first network element at the second time;

determining a ratio between velocities of light at the first and at the second times based on timing information contained in the optical timing signals; and aligning the clock based on at least the ratio between the velocities of light and the timing information.

8. The method of claim 7, wherein a transmission velocity of the optical timing signals at the given wavelength differs between the first and second times but the phase offset between the first and second network elements is substantially the same between the first and second times.

9. A method of determining transit delays in an optical network including a first network element that is connected to a second network element, comprising:

transmitting optical timing signals at a first wavelength and at a second wavelength from the first network element to the second network element;

transmitting optical timing signals at the first wavelength and at the second wavelength from the second network element to the first network element;

determining a ratio between velocities of light at the first wavelength and at the second wavelength based on timing information contained in the optical timing signals; and determining transit delays between the first and second network elements based on at least the ratio between the velocities of light and the timing information, wherein the optical timing signals transmitted from the first network element to the second network element are transmitted over one or more optical links which are distinct from one or more optical links over which the optical timing signals from the second network element to the first network element are transmitted.

10. The method of claim 9, wherein the transit delays include a first transit delay from the first network element to the second network element and a second transit delay from the second network element to the first network element.

11. The method of claim 9, wherein optical timing signals are transmitted at the first wavelength and at the second wavelength over a first optical link from the first network element to the second network element, and optical timing signals are transmitted at the first wavelength and at the second wavelength over a second optical link from the second network element to the first network element.

12. The method of claim 9, wherein the optical timing signals comprise time-stamped packet flows.

13. The method of claim 9, wherein optical timing signals are transmitted at the first wavelength and at the second wavelength over respective first and second optical links from the first network element to the second network element, and optical timing signals are transmitted at the first wavelength and at the second wavelength over respective third and fourth optical links from the second network element to the first network element.

14. A method of determining transit delays in an optical network including a first network element that is connected to a second network element over first and second optical links that are physically distinct from each other, comprising:

transmitting optical timing signals at a given wavelength over the first optical link from the first network element to the second network element at a first time;

transmitting optical timing signals at the given wavelength over the second optical link from the second network element to the first network element at the first time;

transmitting optical timing signals at the given wavelength over the first optical link from first network element to second network element at a second time;

transmitting optical timing signals at the given wavelength over the second optical link from the second network element to the first network element at the second time;

determining a ratio between velocities of light at the first and at the second times based on timing information contained in the optical timing signals; and determining transit delays between the first and second network elements based on at least the ratio between the velocities of light and the timing information.

15. The method of claim 14, wherein a transmission velocity of the optical timing signals at the given wavelength differs between the first and second times but the phase offset between the first and second network elements is substantially the same between the first and second times.

16. The method of claim 15, wherein the transit delays include a first transit delay from the first network element to the second network element and a second transit delay from the second network element to the first network element.

* * * * *